United States Patent
Dinter

(10) Patent No.: US 10,006,538 B2
(45) Date of Patent: Jun. 26, 2018

(54) PLANETARY GEARBOX

(71) Applicant: SIEMENS AKTIENGESELLSCHAFT, München (DE)

(72) Inventor: Ralf Martin Dinter, Gelsenkirchen (DE)

(73) Assignee: FLENDER GMBH, Bocholt (DE)

( * ) Notice: Subject to any disclaimer, the term of this patent is extended or adjusted under 35 U.S.C. 154(b) by 108 days.

(21) Appl. No.: 15/148,553

(22) Filed: May 6, 2016

(65) Prior Publication Data

US 2016/0327148 A1 Nov. 10, 2016

(30) Foreign Application Priority Data

May 7, 2015 (EP) .................................... 15166794

(51) Int. Cl.
*F16H 57/08* (2006.01)
*F16H 57/04* (2010.01)

(52) U.S. Cl.
CPC ....... *F16H 57/0479* (2013.01); *F16H 57/043* (2013.01); *F16H 57/0486* (2013.01); *F16H 57/08* (2013.01); *F16H 2057/085* (2013.01)

(58) Field of Classification Search
CPC ............. F16H 57/0479; F16H 57/0486; F16H 57/043; F16H 2057/085
USPC ........................................ 475/159, 160, 348
See application file for complete search history.

(56) References Cited

U.S. PATENT DOCUMENTS

| 7,335,128 B2* | 2/2008 | Flamang | F03D 1/00 416/170 R |
| 8,246,505 B2* | 8/2012 | Saenz De Ugarte | F16H 57/082 384/585 |
| 2007/0025654 A1* | 2/2007 | Shige | B60B 27/00 384/448 |
| 2007/0265133 A1 | 11/2007 | Smook | |
| 2009/0129717 A1* | 5/2009 | Fujimura | B60B 27/001 384/589 |

(Continued)

FOREIGN PATENT DOCUMENTS

| CN | 101070907 A | 11/2007 |
| CN | 201714918 U | 1/2011 |
| EP | 2383480 A1 | 11/2011 |

(Continued)

*Primary Examiner* — Roger L Pang
(74) *Attorney, Agent, or Firm* — Henry M. Feiereisen LLC

(57) ABSTRACT

A planetary gearbox includes a sun wheel rotatably supported in a gearbox housing and having an external toothing, a rotatable hollow wheel, and a planetary carrier rotatably mounted in the gearbox housing. Planetary wheel bearings mount planetary wheels on the planetary carrier for rotation about planetary wheel axes of rotation. The planetary wheel bearings have external toothings which engage with the internal toothing of the hollow wheel and the external toothing of the sun wheel. Each planetary wheel bearing includes two annular bearing elements which are traversed by and held in fixed rotative engagement on a planetary wheel pin. The bearing elements have each an outer peripheral surface shaped to define a cone-shaped sliding surface such that tapered ends of the bearing elements point to one another and a running surface of an inner peripheral surface of the planetary wheel corresponds to the sliding surface of the planetary wheel bearing.

19 Claims, 4 Drawing Sheets

(56) References Cited

U.S. PATENT DOCUMENTS

2009/0215568 A1* 8/2009 Shibukawa .......... B60K 17/046
                                                                475/159

FOREIGN PATENT DOCUMENTS

| GB | 2514167 A | 11/2014 |
|----|-----------|---------|
| JP | S58166122 A | 10/1983 |
| WO | WO 2014117197 A1 | 8/2014 |

* cited by examiner

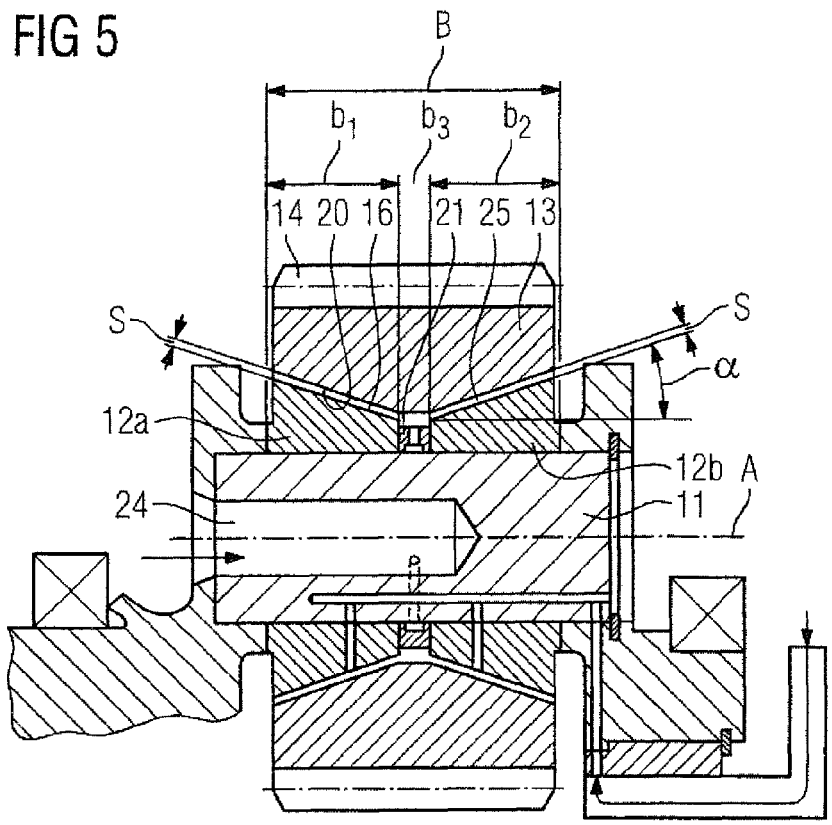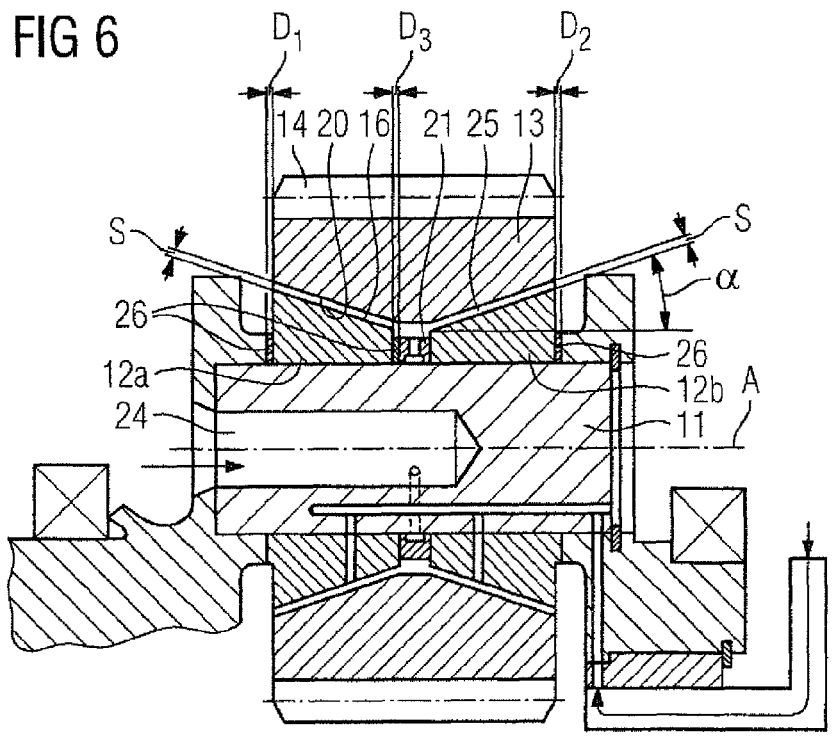

PLANETARY GEARBOX

CROSS-REFERENCES TO RELATED APPLICATIONS

This application claims the priority of European Patent Application, Serial No. 15166794.6, filed May 7, 2015, pursuant to 35 U.S.C. 119(a)-(d), the disclosure of which is incorporated herein by reference in its entirety as if fully set forth herein.

BACKGROUND OF THE INVENTION

The present invention relates to a planetary gearbox, in particular for a wind power plant.

The following discussion of related art is provided to assist the reader in understanding the advantages of the invention, and is not to be construed as an admission that this related art is prior art to this invention.

Planetary gearboxes are used for example as transmission gearboxes to convert a low speed from a drive shaft of the planetary gearbox into a significantly higher speed of an output shaft of the planetary gearbox. Accordingly, planetary gearboxes are frequently installed in wind power plants, where a low speed of the rotor shaft has to be converted into a significantly higher speed of the generator shaft. With the use in wind power plants, planetary gearboxes are operated under very changeable operating conditions due to variable wind conditions. As a result of temporarily extremely low speeds of the drive shaft and at the same time extremely high force effect on the bearing, roller bearings are predominantly installed in planetary gearboxes for wind power plants in order to mount the planetary wheels.

Another approach involves the use of planetary wheel bearings in the form of slide bearings in planetary gearboxes for wind power plants. An example is disclosed in EP 2 383 480 A1 which describes a planetary gearbox having a gearbox housing, in which a central sun wheel with an external toothing is held for rotation about a central gearbox axis of rotation. Furthermore, a hollow wheel with an internal toothing is provided in the gearbox housing concentrically to the central gearbox axis of rotation. A planetary carrier is mounted in the gearbox housing so as to be able to rotate about the central gearbox axis of rotation. A number of planetary wheels are held on the planetary carrier. The planetary wheels have external toothings, which engage with the internal toothing of the hollow wheel and the external toothing of the sun wheel.

The planetary wheels are mounted on planetary wheel bearings configured as radial slide bearings so as to be able to rotate about planetary wheel axes of rotation. For a reliable operation of a radial slide bearing, its bearing clearance must also take into account that during the operation of the radial slide bearing, temperature and/or load-specific extensions and/or deformations may occur. The components of the radial slide bearing and/or the running surfaces of the mounted planetary wheels must therefore be manufactured with high precision, i.e. slight manufacturing tolerances, and/or refinished during assembly, which is associated with high costs.

During operation of the radial slide bearing, the bearing clearance gradually changes as a result of wear, which may result in a malfunction or failure of the radial slide bearing. Regular maintenance and, if necessary, replacement of the radial slide bearing is therefore necessary, when the bearing clearance of the radial slide bearing is about to be outside of an admissible range. This is accompanied by corresponding down times, in particular when wind power plants are involved.

Radial slide bearings can only dissipate radial forces. In order to also guide the planetary wheels axially and to prevent axial movements of the planetary wheels, axial slide bearings are also required, which dissipate axial forces acting on the planetary wheels. Such axial slide bearings can be embodied for instance in the contact range between the sides of the planetary carrier and the end faces of the planetary wheels and increase costs of such planetary wheel bearings.

It would therefore be desirable and advantageous to provide an improved planetary gearbox which obviates prior art shortcomings while being simple in construction and yet reliable in operation.

SUMMARY OF THE INVENTION

According to one aspect of the present invention, a planetary gearbox includes a gearbox housing, a central sun wheel supported in the gearbox housing for rotation about a central gearbox axis of rotation and having an external toothing, a hollow wheel arranged in concentric relationship to the central gearbox axis of rotation in the gearbox housing and having an internal toothing, a planetary carrier mounted in the gearbox housing for rotation about the central gearbox axis of rotation, plural planetary wheels, and planetary wheel bearings configured as slide bearings to mount the planetary wheels on the planetary carrier for rotation about planetary wheel axes of rotation, the planetary wheel bearings having external toothings which engage with the internal toothing of the hollow wheel and the external toothing of the sun wheel, each planetary wheel bearing including two annular bearing elements which are traversed by and held in fixed rotative engagement on a planetary wheel pin, the bearing elements having each an outer peripheral surface shaped to define a cone-shaped sliding surface such that tapered ends of the bearing elements point to one another and a running surface of an inner peripheral surface of the planetary wheel corresponds to the sliding surface of the planetary wheel bearing.

The present invention resolves prior art shortcomings by providing, i.a., cone-shaped sliding surfaces that enable a bearing clearance of the slide bearings to be easily adjusted in a simple manner.

The idea thus underlying the invention is to use axially split double cone slide bearings which are able to dissipate both axial and radial forces. The opposite arrangement of the two cone-shaped sliding surfaces allows a planetary wheel to be fixed both in axial and radial directions. The radial bearing clearance can hereby be easily adjusted by axially adjusting the cone-shaped bearing element relative to the planetary wheel which has corresponding cone-shaped running surfaces. The fixed rotative engagement of the bearing elements can be realized, for example, by shrinking previously produced oversized bearing elements onto the planetary wheel pin after their positioning.

According to another advantageous feature of the present invention, at least one of the bearing elements can be configured for adjustment in an axial direction so as to establish a lubrication gap of a defined height between the sliding surface of the planetary wheel bearing and the running surface of the planetary wheel. An optimal height of the lubrication gap between the sliding surfaces of the planetary wheel bearing and the corresponding running surfaces of the mounted planetary wheel is an essential prerequisite for reliable operation of the planetary gearbox.

Advantageously, one bearing element can be adjustable, while the other bearing element has an axially fixed position. The bearing element with an axially fixed position can serve as a reference for the adjustment of the adjustable bearing element, thereby contributing to a simple and precise setting of the optimal height of the lubrication gap of the planetary wheel bearing.

According to another advantageous feature of the present invention, the axial position of the axially fixed bearing element can be defined by an axial stop. An axial stop can be realized by a side of the planetary carrier or by a radial annular shoulder embodied on the planetary wheel pin.

According to another advantageous feature of the present invention, an adjustment member may be provided to adjust the at least one bearing element in the axial direction. As a result of the presence of such an adjustment member, setting and in particular readjustment of a planetary gearbox according to the present invention can easily be implemented during maintenance works, when the height of the lubrication gap of the slide bearing has changed due to wear.

According to another advantageous feature of the present invention, the adjustment member may include a spacer element arranged between the at least one bearing element and an adjacent side of the planetary carrier, or include a spacer element arranged between the bearing elements. By selecting a suitable number of spacer elements and their arrangement on the specified axial positions within the slide bearing, a height of the lubrication gap of the slide bearing can be adjusted, wherein manufacturing inaccuracies of the bearing components can be equalized.

According to another advantageous feature of the present invention, the adjustable bearing element can be screwed into the planetary wheel pin. For this purpose, the adjustable bearing element can have an internal thread and the planetary wheel pin can have a corresponding external thread. The axial position of the adjustable bearing element can be continuously adjusted by rotation about the planetary wheel pin using a screw connection of this type.

As an alternative, the adjustable bearing element can be screwed into an adjacent side of the planetary carrier. For this purpose, the adjustable bearing element can have an external thread and an adjacent side of the planetary carrier can have a corresponding internal thread. With a screw connection of this type, the axial position of the adjustable bearing element can be continuously set by screwing into an adjacent side of a planetary carrier.

According to another advantageous feature of the present invention, a torsion-proof securing element can be provided to fix the bearing element screwed onto the planetary carrier or into the side. A torsion-proof securing element allows for the secure fixing of the set axial position of the adjustable bearing element.

In accordance with the invention, a combination of different adjustment members may, of course, also be possible in order to set the optimal height of the lubrication gap of the planetary wheel bearing.

According to another advantageous feature of the present invention, the sliding surface of each bearing element can have at least one lubrication pocket in communication with a lubricant duct sized to radially extend through the bearing element, with the lubricant duct being connected to an eccentric lubricant supply duct extending in the planetary wheel pin in an axial direction. During normal operation of the planetary gearbox, lubricant is supplied to the sliding surfaces of the planetary wheel bearing within the scope of a pressure feed lubrication. The lubricant is introduced into the eccentric lubricant supply duct under pressure, and flows from there, through lubricant ducts into the lubrication pockets, from where it is distributed onto the sliding surfaces.

According to another advantageous feature of the present invention, a spacer ring can be disposed between the bearing elements in surrounding relationship to the planetary wheel pin and define a minimal axial distance between the bearing elements. The provision of such a spacer ring can prevent the axial distance and thus the height of the lubrication gap from being set too small, which would oppose a smoothest possible run of the planetary wheel during operation.

According to another advantageous feature of the present invention, the spacer ring has an inner peripheral surface which can be formed with an annular lubricant collecting groove. This lubricant collecting groove can be used to distribute lubricant between the bearing elements.

According to another advantageous feature of the present invention, the spacer ring can have formed therein a plurality of lubricant ducts which feed into the lubricant collecting groove. Lubricant can flow out of the lubricant collecting groove through these lubricant ducts in the direction of the lubrication gap.

According to another advantageous feature of the present invention, the planetary wheel pin can have formed therein a central lubricant supply duct which radially feeds into the lubricant collecting groove of the spacer ring. Lubricant can be supplied to the lubricant collecting groove provided in the spacer ring through such a lubricant supply duct in the form of rolling lubrication. The rolling lubrication allows the planetary gearbox to be operated further during emergency operation if the pressure feed lubrication fails.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 shows a sectional view of the planetary wheel bearing of FIG. 4;

FIG. 6 shows an axial cross-sectional view of a planetary wheel bearing of a second embodiment of a planetary gearbox according to the present invention;

DETAILED DESCRIPTION OF PREFERRED EMBODIMENTS

Figure 1:
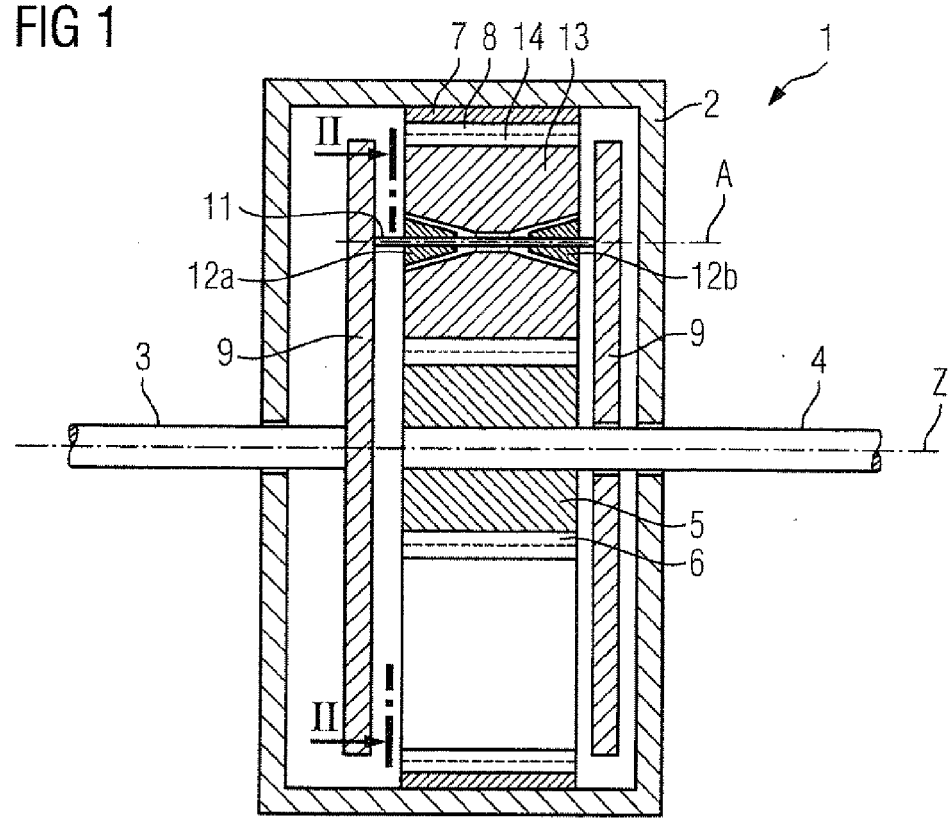
FIG. 1 shows a schematic axial cross-sectional view of a first embodiment of a planetary gearbox according to the present invention.
Figure 2:
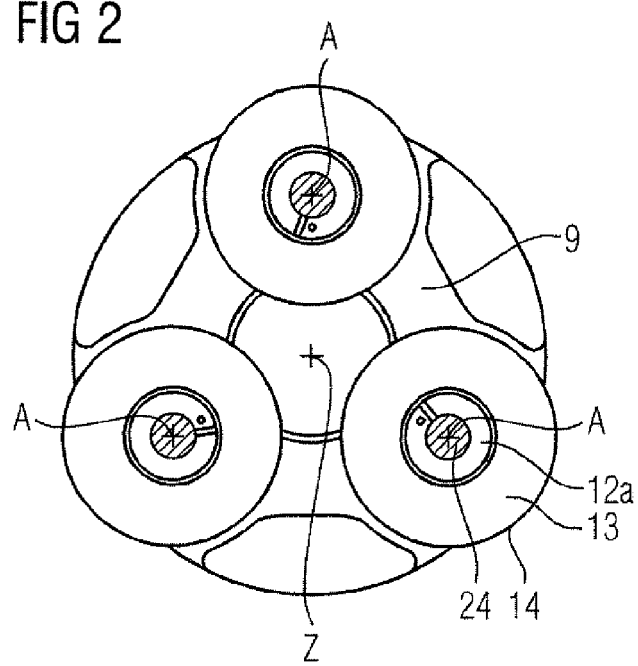
FIG. 2 shows an axial top view of a planetary carrier of the planetary gearbox shown in FIG. 1, taken along the line II-II.
Figure 3:
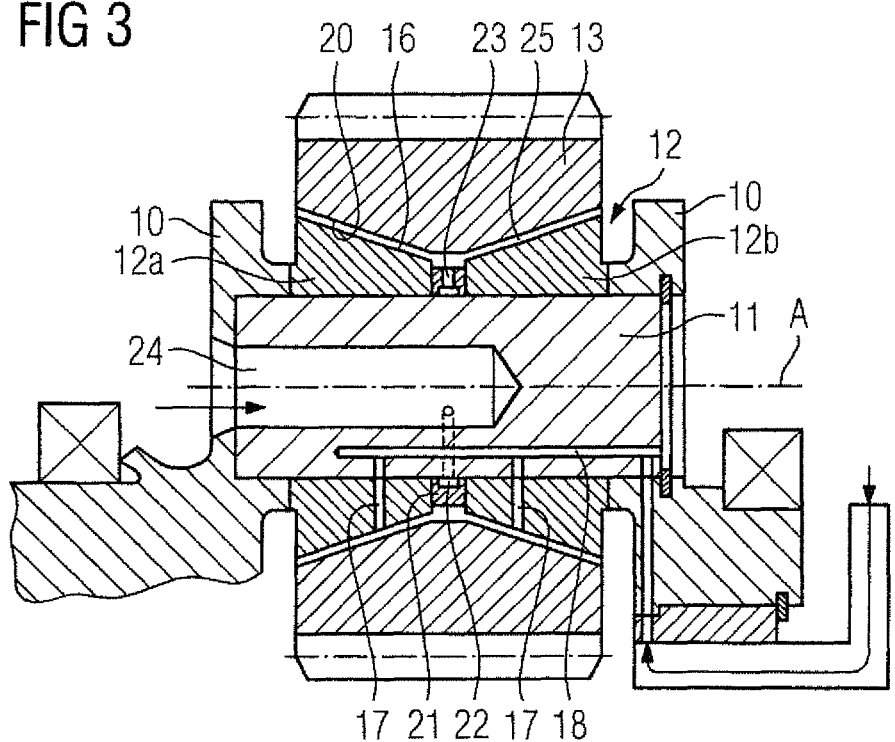
FIG. 3 shows a perspective side view of a bearing element of the planetary gearbox shown in FIG. 1.
Figure 4:
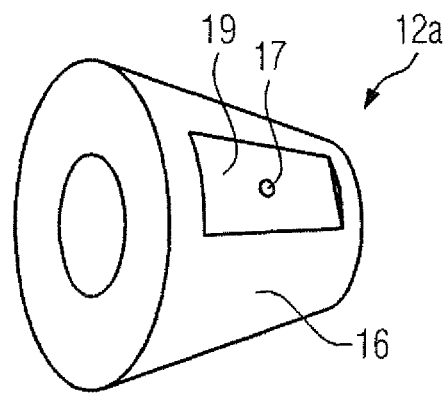
FIG. 4 shows an axial cross-sectional view of a planetary wheel bearing of the planetary gearbox shown in FIG. 1.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

FIGS. 1 to 5 show a planetary gearbox 1 according to a first embodiment of the present invention. The planetary gearbox 1 has a gearbox housing 2, which, on opposing end faces, is traversed by a drive shaft 3 and an output shaft 4. In the gearbox housing 2, a central sun wheel 5 with an external toothing 6 is held on the output shaft 4 so as to be able to rotate about a central gearbox axis of rotation Z. Arranged in the axial direction corresponding to the sun wheel 5 in the gearbox housing 2 is a hollow wheel 7 which is concentric to the central gearbox axis of rotation Z and has an internal toothing 8. The hollow wheel 7 is fixedly connected to the gearbox housing 2 and surrounds the sun wheel 5. On the drive shaft 3, a planetary carrier 9 is held in the gearbox housing 2 so as to be able to rotate about the central gearbox axis of rotation Z.

The planetary carrier 9 has sides 10, between which three planetary wheel axes 11 are arranged, of which only one planetary wheel pin is shown in FIG. 1 for the sake of greater clarity. The planetary carrier 9 may, of course, also support planetary wheel pins of a number that deviates from three. A planetary wheel bearing 12 embodied as a sliding bearing is provided on each planetary wheel pin 11, in which planetary wheel bearing a planetary wheel 13 is mounted for rotation about a planetary wheel pin of rotation A. The planetary wheels 13 have external toothings 14, which engage with the Internal toothing 8 of the hollow wheel 7 and the external toothing 6 of the sun wheel 5.

According to the invention, each planetary wheel bearing 12 includes two annular bearing elements 12a, 12b, which are traversed by the planetary wheel pin 11 and held in a torsion-resistant manner thereupon. Cone-shaped sliding surfaces 16 are embodied on the outer peripheral surfaces of the bearing elements 12a, 12b, which define with the central gearbox axis of rotation Z an acute angle α, which currently preferred ranges between 5° and 40°. Chamfers or the like can be provided in axial edge regions of the sliding surfaces 16, in order to counteract the formation of edges due to wear and tear.

Each bearing element 12a, 12b is radially traversed by a lubricant duct 17. The lubricant duct 17 is connected to an eccentric lubricant supply duct 18, which axially traverses the planetary wheel pin 11. The lubricant duct 17 opens into a lubrication pocket 19, which is embodied as a flattening or recess in a minimally loaded region of the sliding surface 16 of the bearing element 12a, 12b. During regular operation of the planetary wheel bearing 12 in the form of a pressure feed lubrication, lubricant is supplied to the sliding surfaces 16 through the lubricant supply duct 18, the lubricant duct 17 and the lubrication pocket 19.

The tapered ends of the bearing elements 12a, 12b point to one another, wherein corresponding running surfaces 20 are embodied on inner peripheral surfaces of the planetary wheel 13 relative to the sliding surfaces 16 of the planetary wheel bearing 12.

A spacer ring 21 is arranged between the bearing elements 12a, 12b of the planetary wheel bearing 12. The spacer ring 21 surrounds the planetary wheel pin 11 and defines a minimal distance between the bearing elements 12a, 12b.

Formed on an inner peripheral surface of the spacer ring 21 is an annular lubricant collecting groove 22, into which a plurality of lubricant ducts 23, which extend through the spacer ring 21, feed into. Corresponding to the lubricant collecting groove 22 of the spacer ring 21, a central lubricant supply duct 24 which opens into the lubricant collecting groove 22 of the spacer ring 21 is embodied in the planetary wheel pin 11. A rolling lubrication of the planetary wheel bearing 12 can take place through the central lubricant supply duct 24, the lubricant collecting groove 22 and the plurality of lubricant ducts 23, and is sufficient for an emergency operation of the planetary gearbox.

FIG. 5 shows the planetary wheel bearing 12 of the planetary gearbox 1 according to the first embodiment of the present invention with dimensions being designated. The axial widths $b_1$ and $b_2$ of the bearing elements 12a, 12b and $b_3$ of the spacer ring 21 fulfill the relationship $b_1+b_2+b_3=B$, with B referring to the width of the planetary wheel bearing 12 between opposite sides 10 of the planetary carrier 9. In this way the bearing element 12a, 12b and the spacer ring 21 are axially fixed between the sides 10 of the planetary carrier 9.

After manufacture, the bearing elements 12a, 12b and the spacer ring 21 initially fulfill the relationship $b_1+b_2+b_3>B$. During assembly of the planetary wheel bearing 12, the widths of the two bearing elements 12a, 12b and/or the spacer ring 21 are readjusted by a machining process, such that the relationship $b_1+b_2+b_3=B$ is fulfilled and a required height S of the lubrication gap 25 is set by suitably selecting the widths $b_1$, $b_2$ and $b_3$. Here the relationship $\Delta S=\Delta b*\sin(\alpha)$ exists between a height change $\Delta S$ in the lubrication gap 25 and an axial adjustment of the respective bearing element 12a, 12b effected by a change in width $\Delta b$.

FIG. 6 shows a planetary wheel bearing 12 of a second embodiment of a planetary gearbox 1 according to the present invention. Spacer elements 26 are inserted between a bearing element 12a and the spacer ring 21 and between the bearing elements 12a, 12b and respectively adjacent sides 10 of the planetary carrier 9. The axial widths $b_1$, $b_2$ and $b_3$ of the bearing elements 12a, 12b and of the spacer ring 21 on the one hand and $D_1$, $D_2$ and $D_3$ of the spacer elements 26 on the other hand fulfill the relationship $b_1+b_2+b_3+D_1+D_2+D_3=B$, so that the bearing elements 12a, 12b, the spacer ring 26 and the spacer elements 26 are axially set between opposite sides 10 of the planetary carrier 9.

After manufacture, the bearing elements 12a, 12b and the spacer ring 21 firstly fulfill the relationship $b_1+b_2+b_3<B$ in order to set the desired height S of the lubrication gap 25. Here $b_1$, $b_2$, $b_3$ and B are defined as in the embodiment shown in FIG. 5, and $D_1$, $D_2$ and $D_3$ refer to the axial widths of the spacer elements 26.

The axial widths of the bearing elements 12a, 12b and of the spacer ring 21 initially fulfill the relationship $b_1+b_2+b_3<B$. During assembly, spacer elements 26 of a suitable thickness $D_1$, $D_2$ and $D_3$ are inserted at the specified locations such that the total axial thickness $D_1+D_2+D_3$ of all inserted spacer elements 26 is equal to the difference between the bearing width B and the total axial widths $b_1+b_2+b_3$ of the bearing elements 12a, 12b and of the spacer ring 21 and the lubrication gap S has the required height S.

Figure 7:
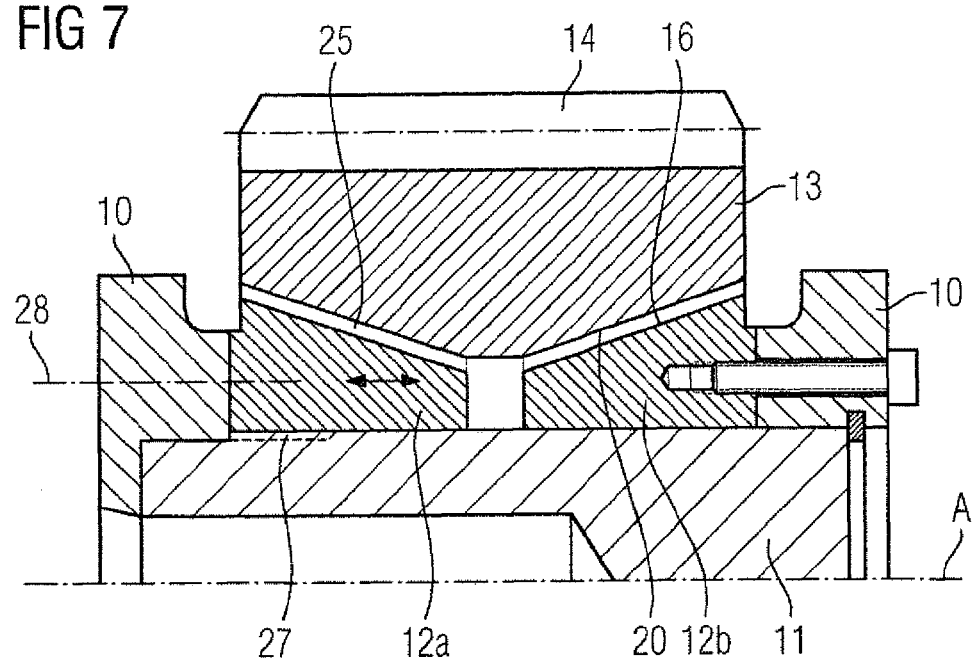
FIG. 7 shows an axial cross-sectional view of a planetary wheel bearing of a third embodiment of a planetary gearbox according to the present invention.

FIG. 7 shows a planetary wheel bearing 12 of a third embodiment of a planetary gearbox 1 according to the present invention. The adjustable bearing element 12a is screwed onto the planetary wheel pin 11. For this purpose, the adjustable bearing element 12a has an internal thread and the planetary wheel pin 11 has a corresponding external thread. This screw connection 27 allows for a continuous adjustment of the axial position of the adjustable bearing element 12a on the planetary wheel pin 11. The axially fixed bearing element 12b is screwed to the adjacent side 10 of the planetary carrier 9, as a result of which the side 10 of the planetary carrier 9 acting as an axial stop defines the axial position of the axially fixed bearing element 12b. When the required height S of the lubrication gap 25 is reached, the bearing element 12a is fixed in the corresponding axial position by a torsion-proof securing element 28. Pins, bolts or the like can be used as the torsion-proof securing element 28. When the height S of the lubrication gap 25 changes over the course of time as a result of wear due to use, the adjustable bearing element 12a can be readjusted accordingly in order to reestablish the required height S of the lubrication gap 25.

Figure 8:
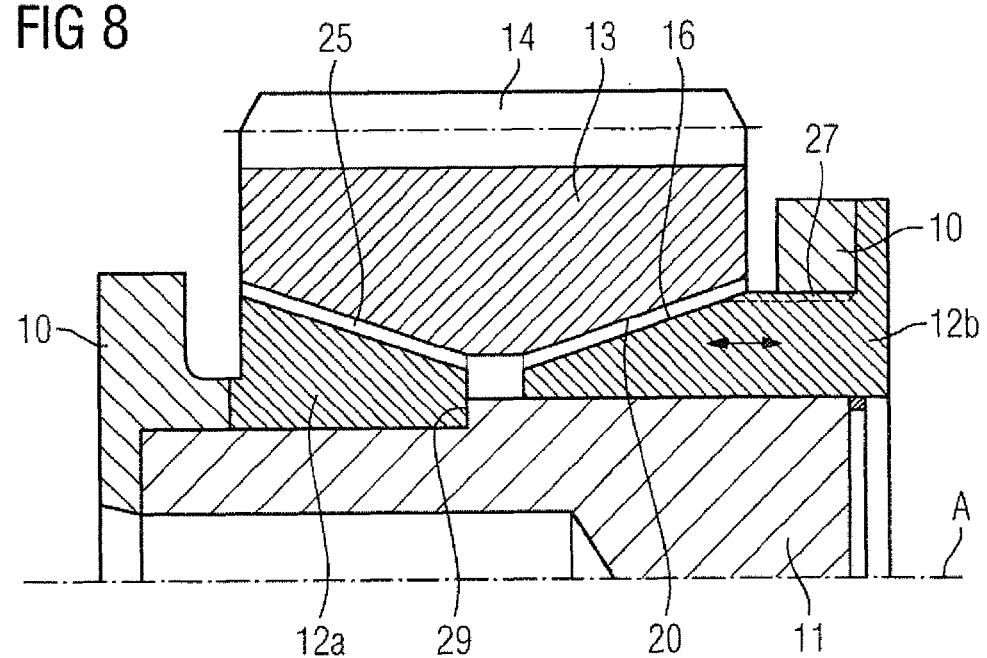
FIG. 8 shows an axial cross-sectional view of a planetary wheel bearing of a fourth embodiment of a planetary gearbox according to the present invention.

FIG. 8 shows a planetary wheel bearing 12 of a fourth embodiment of a planetary gearbox 1 according to the present invention. The adjustable bearing element 12b is screwed into an adjacent side 10 of the planetary carrier 9. For this purpose, the adjustable bearing element 12b has an external thread and the side 10 of the planetary carrier 9 has an internal thread. This screw connection 27 allows the bearing element 12b to be screwed in the axial direction more or less into the side 10 of the planetary carrier 9 and to be fixed in any axial position using a torsion-proof securing element 28. Pins, bolts or the like can be used here as the torsion-proof securing element 28. The axial position of the axially fixed bearing element 12a is fixed by a radial annular shoulder 29 embodied on the planetary wheel pin 11 and serving as an axial stop. The required height S of the lubrication gap 25 can be set by screwing the adjustable bearing element 12b in or out. When the height S of the lubrication gap 25 of the planetary wheel bearing 12 has shifted as a result of wear due to use, the planetary wheel bearing 12 can be readjusted by axially adjusting the bearing element 12b accordingly.

For improved flexibility when adjusting planetary wheel bearings 12 of planetary gearboxes 1 according to the invention, the procedure proposed in FIGS. 5 to 8 for setting an optimal height of the lubrication gap 25 of the planetary wheel bearing 12 can be combined with one another.

During operation of the planetary gearbox 1, the planetary carrier 9 is set to rotate by the drive shaft 3. Due to the engagement of its external toothing 14 into the internal toothing 8 of the hollow wheel 7, the planetary wheels 13 roll along the interior of the hollow wheel 7. By rotating the planetary wheels 13, due to the engagement of its external toothing 14 into the external toothing 6 of the sun wheel 5, the sun wheel 5 and with it the output shaft 4 are in turn caused to rotate. In this way, the output shaft 4 rotates at a higher speed than the drive shaft 3, because the planetary wheels 13 have a smaller periphery than the circle which the planetary wheel axes of rotation A describe during their rotation about the central gearbox axis of rotation Z of the planetary gearbox 1.

During operation of the slide bearing, lubricant is continuously supplied thereto through the central lubricant supply duct 24. The lubricant is initially distributed in the lubricant collecting groove 22 of the spacer ring 21 and then flows through the at least one lubricant duct 23 in the direction of the lubrication gap 25.

A major advantage of a planetary gearbox 1 according to the present invention resides in the absence of any additional axial slide bearings in contrast to cylindrical slide bearings, in order to fix the planetary wheel 13 in the axial direction. As a result, there is no need for formation of additional axial sliding surfaces. A further advantage of the inventive slide bearing lies in the simple ability to set and readjust the height S of the lubrication gap 25, which allows for a larger component tolerance when the components required for the planetary wheel bearing are manufactured. Overall, during use of a planetary gearbox according to the invention, cost benefits can be achieved due to lower manufacturing costs and a longer service life of the planetary wheel bearing 12 can be realized because of the readjustment options.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A planetary gearbox, comprising:
   a gearbox housing;
   a central sun wheel supported in the gearbox housing for rotation about a central gearbox axis of rotation, said sun wheel having an external toothing;
   a hollow wheel arranged in concentric relationship to the central gearbox axis of rotation in the gearbox housing, said hollow wheel having an internal toothing;
   a planetary carrier mounted in the gearbox housing for rotation about the central gearbox axis of rotation;
   plural planetary wheels; and
   planetary wheel bearings configured as slide bearings and configured to mount the planetary wheels on the planetary carrier for rotation about planetary wheel axes of rotation, said planetary wheel bearings having external toothings which engage with the internal toothing of the hollow wheel and the external toothing of the sun wheel, each said planetary wheel bearing comprising two annular bearing elements which are traversed by and held in fixed rotative engagement on a planetary wheel pin, said bearing elements having each an outer peripheral surface shaped to define a cone-shaped sliding surface such that tapered ends of the bearing elements point to one another and a running surface of an inner peripheral surface of the planetary wheel corresponds to the sliding surface of the planetary wheel bearing.

2. The planetary gearbox of claim 1, constructed for use in a wind power plant.

3. The planetary gearbox of claim 1, wherein the bearing elements are arranged in axial spaced-apart relationship.

4. The planetary gearbox of claim 1, wherein at least one of the bearing elements is configured for adjustment in an axial direction so as to establish a lubrication gap of a defined height between the sliding surface of the planetary wheel bearing and the running surface of the planetary wheel.

5. The planetary gearbox of claim 1, wherein one of the two bearing elements is configured for adjustment in an axial direction so as to establish a lubrication gap of a defined height between the sliding surface of the planetary wheel bearing and the running surface of the planetary wheel, said other one of the two bearing elements being fixed in an axial position.

6. The planetary gearbox of claim 5, further comprising an axial stop defining the axial position of the other one of the bearing elements.

7. The planetary gearbox of claim 6, wherein the axial stop is formed by a radial annular shoulder of the planetary wheel pin.

8. The planetary gearbox of claim 6, wherein the axial stop is formed by a side of the planetary carrier.

9. The planetary gearbox of claim 4, further comprising an adjustment member configured to adjust the at least one bearing element in the axial direction.

10. The planetary gearbox of claim 9, wherein the adjustment member includes a spacer element arranged between the at least one bearing element and an adjacent side of the planetary carrier.

11. The planetary gearbox of claim 9, wherein the adjustment member includes a spacer element arranged between the bearing elements.

12. The planetary gearbox of claim 4, wherein the at least one bearing element is screwed into the planetary wheel pin.

13. The planetary gearbox of claim 4, wherein the at least one bearing element is screwed into the adjacent side of the planetary carrier.

14. The planetary gearbox of claim 12, further comprising a torsion-proof securing element configured to fix the at least one bearing element in the axial direction.

15. The planetary gearbox of claim 1, wherein the sliding surface of each bearing element has at least one lubrication pocket in communication with a lubricant duct sized to radially extend through the bearing element, said lubricant duct being connected to an eccentric lubricant supply duct extending in the planetary wheel pin in an axial direction.

16. The planetary gearbox of claim 1, further comprising a spacer ring disposed between the bearing elements in surrounding relationship to the planetary wheel pin and defining a minimal axial distance between the bearing elements.

17. The planetary gearbox of claim 16, wherein the spacer ring has an inner peripheral surface formed with an annular lubricant collecting groove.

18. The planetary gearbox of claim 17, wherein the spacer ring has formed therein a plurality of lubricant ducts which feed into the lubricant collecting groove.

19. The planetary gearbox of claim 17, wherein the planetary wheel pin has formed therein a central lubricant supply duct which feeds into the lubricant collecting groove of the spacer ring.

* * * * *